United States Patent

[11] 3,630,605

| [72] | Inventor | Joseph H. Lock |
| | | 520 Villa Ave. S.E., Mableton, Ga. 30059 |
| [21] | Appl. No. | 3,953 |
| [22] | Filed | Jan. 19, 1970 |
| [45] | Patented | Dec. 28, 1971 |

[54] ORTHOGRAPHIC IMAGE-PROJECTING DEVICE
4 Claims, 3 Drawing Figs.

[52] U.S. Cl. .................................................... 355/1,
350/96 B, 355/52
[51] Int. Cl. ................................................. G03b 27/48
[50] Field of Search ........................................ 355/1, 52;
350/96 B

[56] References Cited
UNITED STATES PATENTS

| 3,175,481 | 3/1965 | Lahr ............................. | 355/1 |
| 3,277,306 | 10/1966 | Blankenship ................ | 355/1 X |
| 3,125,013 | 3/1964 | Herrick, Jr. et al. .......... | 355/1 |

*Primary Examiner*—Samuel S. Matthews
*Assistant Examiner*—Richard A. Wintercorn
*Attorney*—Walter M. Rodgers ABSTRACT: An orthographic image-projecting device which is useful for projecting a planar image of a three-dimensional object comprises a source of radiation arranged so that the rays from the source are reflected from the object, directional ray transmission means disposed in the path of rays reflected from the object and a arranged to transmit reflected rays in one general direction, image-producing means responsive to rays emitted by the ray transmission means and image recording means which may be in the form of a device which records the image produced on the image-producing means. A scanning mechanism imparts movement to the directional ray transmission means which is transverse to the direction of transmission of rays therethrough and a radiationtight enclosure is disposed about the image-recording device and the image-producing device. For some applications of the invention the so-called image-producing means may be eliminated and the rays from the ray transmission means may be directed onto an image-recording means.

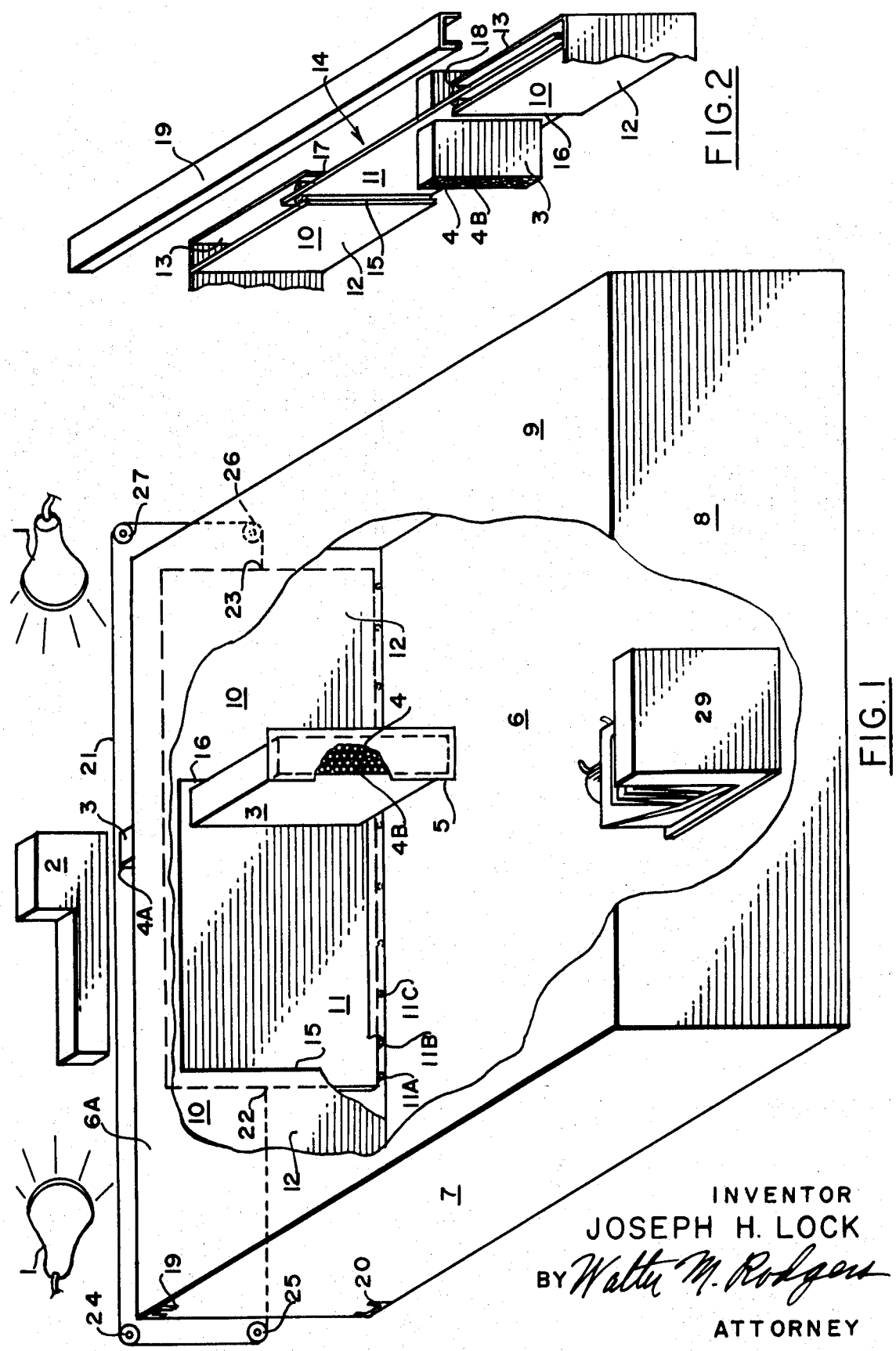

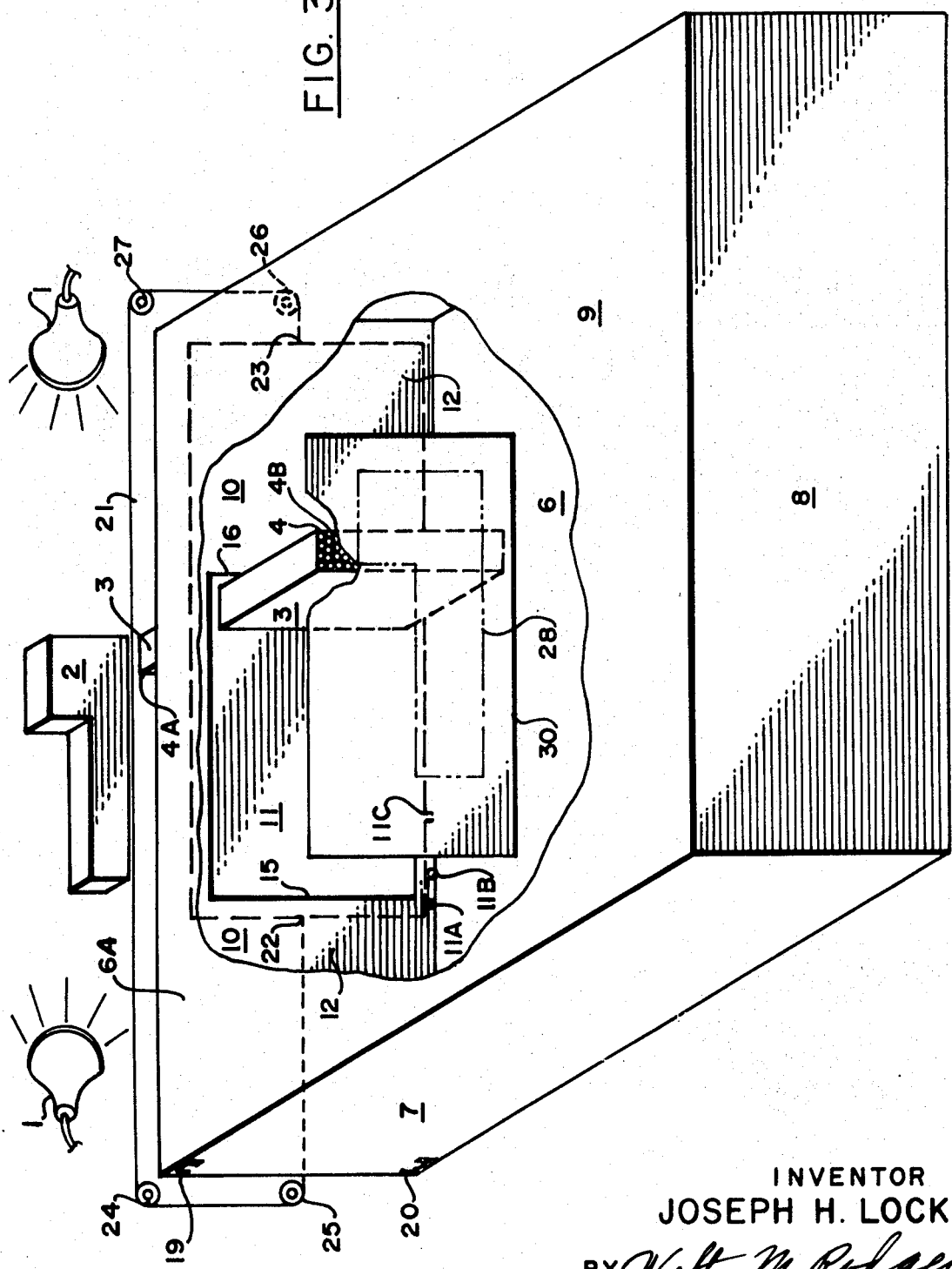

ORTHOGRAPHIC IMAGE-PROJECTING DEVICE

Copying devices are well known wherein a planar object such as a photograph drawing, a page of printed material or the like can be readily reproduced on a planar surface. Such devices may take the form of electrostatic image-producing means, heat-responsive image-producing means, chemical means and the like.

Well-known and long-understood drafting techniques are commonly used to produce top, front and end views of three-dimensional objects which views are, of course, planar in nature.

According to this invention, ray transmission means which is directional is employed to receive rays reflected from an object which may be three-dimensional and in turn such transmission means emits directional rays to an image-producing device which in turn is exposed to an image-recording device so that a planar image which is recorded by the recording device is provided for the object from which rays are reflected. Preferably, the directional transmission means is provided with scanning means whereby each increment of area of the object is scanned and the light reflected therefrom is transmitted to the image-producing means. The scanning means imparts movement to the image transmission means which is transverse to the direction of ray transmission therethrough. For some conditions the image-producing means may be eliminated and the rays from the directional transmission means may be directed to the recording means.

For a better understanding of the invention reference may be had to the following detailed description taken in conjunction with the accompanying drawing in which:

FIG. 1 is a schematic perspective view of the essential elements of one form of the invention and which shows the elements in cooperation with each other according to the invention;

FIG. 2 is an enlarged perspective view of a portion of FIG. 1; and

FIG. 3 is a view similar to FIG. 1 but in which the image-producing means is eliminated.

In the drawings the numeral 1 designates a source or sources of radiation from which radiation is emitted. While source of radiation 1 could take any of a number of forms, such source preferably constitutes a source of electromagnetic radiation which emits radiation in the visible spectrum. Source of radiation 1 is arranged in proximity to the object 2 and of course rays emitted by source 1 are reflected in random directions from object 2. A certain amount of radiation reflected from object 2 is emitted in the general direction of directional ray transmission device 3. Ray transmission device 3 may take any suitable form which effectively limits scattering of the rays and preferably constitutes a plurality of parallel elongated hollow elements 4 arranged in close proximity to each other and which are of such nature that radiation reflected from object 2 is transmitted through the elements 4 in a direction along the axes of elements 4. Thus radiation entering the ends 4A of directional transmission elements 4 travels axially thereof and is emitted from the ends 4B thereof. Radiation emitted from transmission elements 4 is directed to image-producing means 5 which preferably is in the form of an image-producing screen such as frosted glass or the like affixed to the ends 4B of tubes 4. Radiationtight enclosure may constitute a boxlike structure having a bottom 6, sidewalls 7, 8 and 9 mounted about the edges of bottom 6 together with a scanning device on which the ray transmission means 3 is mounted. Top wall 6A overlies the entire structure. The fourth side of the enclosure as schematically shown in the drawings constitutes a radiationtight wall 10 in which a doorlike panel 11 is slidably mounted and which supports ray transmission elements 4 intermediate their ends.

As is best shown in FIG. 2 doorlike panel 11 is arranged with its side edges between the two panels 12 and 13 which constitute the wall 10. An opening 14 is defined by the edges 15 and 16 of panel 12 and the coincident edges 17 and 18 of panel 13. The door 11 effectively closes the opening 14 and is slidable horizontally generally from right to left and vice versa.

The panels 12 and 13 are interposed between the top channel 19 and the bottom channel 20 and are secured thereto by a lighttight connection and the door 11 is slidably mounted in a lighttight fashion as by means of a conventional felt or similar material disposed in close sliding contact with the door 11 and affixed to panels 12 and 13 about opening 14.

For purposes of imparting sliding movement to the door 11 and scanning movement to transmission means 3, a flexible line 21 may be connected at its ends 22 and 23 to opposite sides of door 11. Line 21 is mounted on pulleys 24, 25, 26 and 27 which in turn are fixedly mounted in conventional fashion on structure not shown in the drawing. The line 21 may be moved on its pulleys manually or by suitable motive means such as a reversible electric motor (not shown) and low-friction roller bearing such as are indicated at 11A, 11B, and 11C may be disposed in channel 20 underneath the door 11. Door 11, line 21 and associated parts constitute scanning means.

From the above description, it is apparent that scanning movement of radiation transmission means 3 from left to right causes a directional transmission of rays reflected by object 2 to be projected onto image-producing screen 5. This image is represented in the drawings by the numeral 28 and of course is representative of the image of the object 2 transmitted by increments by ray transmission means and is of a planar character although the planar representations designated at 28 is imaginary and appears in whole only when recorded as by a camera 29.

A scanning operation may constitute sequential left to right and right to left movement of the ray transmission means 3, or if desired, may be arranged to comprise movement in any direction of ray transmission means 3 whether left to right, right to left, up or down so long as movement of ray transmission means 3 is imparted in a direction which is normal or perpendicular to the direction of transmission of light through the elements 4 or to the axis of those elements so as to produce an orthographic projection.

Elements 4 may constitute a plurality of hollow tubelike devices of small diameter through which radiation reflected from object 2 travels in a direction parallel to the axes of elements 4. The resolution achieved is dependent on the diameter of tubes 4.

In similar fashion the schematically represented door 11 may constitute other means such as is sometimes referred to as a roller blind shutter, it being simply essential that scanning means 11 be effective to shield the image-producing means 5 from extraneous external radiation while simultaneously imparting transverse movement to ray transmission means 3 which is in a direction perpendicular to the axes of elements 4.

Of course image-recording device 29 is arranged in such a position within the radiationtight enclosure that its shutter is open for the duration of a scanning operation and so that a photographic reproduction of the image 28 formed on screen 5 is recorded on suitable sensitized film or the like within image-recording device 29. The recorded image preferably is of a desired scale with reference to the actual dimensions of the object 2 and this scale may be determined by the spacing of recorder 29 from image-producing screens.

The arrangement as described above utilizes image-producing screen 5 and image-recording means 29. In order to transcend the limitations in image size which would be imposed by a device such as a camera 29, a sensitized screen may be used instead of camera 29 and the image-producing means 5 may be eliminated. Such an arrangement is shown in FIG. 3. In FIG. 3 the numeral 30 indicates a sensitized screen spaced a short distance from the ends 4B of ray transmission tubes 4. In the arrangement of FIG. 3, the image is recorded directly on the sensitized screen 30 and by this means a larger reproduced image may be provided than would be possible with the camera 29.

For very large objects to be produced such as large machines and the like, it may be necessary to mount the sensitized screen 30 at its ends on suitable rollers which themselves are mounted on frame structure which forms a part of the support for ray transmission means 3 so that the screen 30 and its roller support moves bodily with the transmission means. Stated otherwise the screen 30 could be mounted so as to move as a unit with the ray transmission device 3 and means could be provided to insure relative movement of the ends of tubes 4B relative to each area of the screen 5 so as to expose a large linear surface of screen 30. In such an event, a different type of light enclosure would be utilized and simply would envelop the ends 4B of the ray transmission device 3 as well as all elements of the sensitized screen.

While the invention as shown on the drawing schematically and described above is beneficial primarily in that it constitutes an efficient means for providing a planar image of a three-dimensional device, the invention is not limited for use in conjunction with such an object and may be used to reproduce a planar image of a planar object if desired.

The embodiments of the invention in which an exclusive property or privilege is claimed are defined as follows:

1. A device for projecting a planar image of a three-dimensional object, said device comprising a source of radiation arranged to radiate rays in the region of the object which are reflected therefrom, directional ray transmission means disposed in the path of rays which are reflected from the object for transmitting said rays in one general direction, and planar image-producing means disposed in substantially normal relation to the path of radiation emitted from said ray transmission means for producing a planar image of the object.

2. A device according to claim 1 wherein said directional ray transmission means comprises a plurality of parallel elongated hollow elements arranged in close proximity to each other so that reflected radiation is transmitted through said hollow elements axially thereof.

3. A device according to claim 1 wherein a scanning mechanism is provided for imparting movement to said ray transmission means relative to the object which is transverse to the direction of transmission of rays through said ray transmission means and wherein said image-producing means is mounted on and movable with said ray transmission means.

4. A device for projecting a planar image of a three-dimensional object, said device comprising a source of radiation arranged to radiate rays in the region of the object which are reflected therefrom, directional ray transmission means disposed in the path of rays which are reflected from the object for transmitting said rays in one general direction, image-recording means disposed in substantially normal relation to the path of radiation emitted by said ray transmission means and in close proximity thereto, and scanning means for imparting movement to said ray transmission means in a direction transverse to the direction of radiation therethrough.

* * * * *